United States Patent
Takimoto

(10) Patent No.: US 10,657,281 B2
(45) Date of Patent: May 19, 2020

(54) INFORMATION PROCESSING APPARATUS AND METHOD FOR SPECIFYING LEARNING DATA

(71) Applicant: CANON KABUSHIKI KAISHA, Tokyo (JP)

(72) Inventor: Masafumi Takimoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1 day.

(21) Appl. No.: 16/059,965

(22) Filed: Aug. 9, 2018

(65) Prior Publication Data

US 2018/0349633 A1  Dec. 6, 2018

Related U.S. Application Data

(63) Continuation of application No. PCT/JP2017/003385, filed on Jan. 31, 2017.

(30) Foreign Application Priority Data

Feb. 12, 2016 (JP) ................................ 2016-025013

(51) Int. Cl.
*G06F 21/00* (2013.01)
*G06F 21/62* (2013.01)
(Continued)

(52) U.S. Cl.
CPC ........... *G06F 21/6227* (2013.01); *G06K 9/46* (2013.01); *G06K 9/6215* (2013.01); *G06N 20/00* (2019.01); *G06F 2221/2113* (2013.01)

(58) Field of Classification Search
None
See application file for complete search history.

(56) References Cited

U.S. PATENT DOCUMENTS

2007/0189584 A1* 8/2007 Li ................... G06K 9/00295
382/118
2010/0272351 A1* 10/2010 Kato ................ G06K 9/00986
382/159

FOREIGN PATENT DOCUMENTS

JP      2010-102690 A    5/2010
JP      2012-252507 A    12/2012

OTHER PUBLICATIONS

Pan, S. J., et al, "A Survey on Transfer Learning", IEE Transactions on Knowledge and Data Engineering, 2009, vol. 22, No. 10 (Year: 2009).*

(Continued)

*Primary Examiner* — Andrew J Steinle
(74) *Attorney, Agent, or Firm* — Canon U.S.A., Inc., IP Division

(57) ABSTRACT

An information processing apparatus includes level setting unit configured to set a disclosure level of learning data used when a discriminator is generated, first specifying unit configured to specify, in accordance with the disclosure level, disclosure data to be disclosed to administrators other than a first administrator who manages the learning data in the learning data and association data which is associated with the learning data, second specifying unit configured to specify, in accordance with the disclosure level, reference data which is referred to by the first administrator in the learning data and the association data of the other administrators which are registered in a common storage apparatus, obtaining unit configured to obtain the reference data specified by the second specifying unit from the common storage apparatus, and generating unit configured to generate a discriminator using data obtained by the obtaining unit.

13 Claims, 9 Drawing Sheets

(51) Int. Cl.
*G06K 9/46* (2006.01)
*G06K 9/62* (2006.01)
*G06N 20/00* (2019.01)

(56) References Cited

OTHER PUBLICATIONS

Pan, S. J., et al, "A Survey on Transfer Learning", IEE Transactions on Knowledge and Data Engineering, 2009, vol. 22, No. 10.
Machida, S., et al., "Prototype Implementation of Adaptive Disclosure Controls by Detecting Sensitive Data Leaks", The Institute of Electronics, Information and Communication Engineers, 2014, pp. 51-56, vol. 113, No. 480.

\* cited by examiner

FIG. 3A

| | MEANING OF DISCLOSURE LEVEL | DISCLOSURE DATA OF OWN APPARATUS | | | |
|---|---|---|---|---|---|
| | | SELECTED FEATURE VALUES | ALL FEATURE VALUES | IMAGING PARAMETER | INPUT ORIGINAL IMAGE |
| Lv.1 | NOT DISCLOSED | | | | |
| Lv.2 | DISCLOSE ONLY SELECTED FEATURE VALUES | ✓ | | | |
| Lv.3 | DISCLOSE ALL EXTRACTED FEATURE VALUES | ✓ | ✓ | | |
| Lv.4 | DISCLOSE DATA OTHER THAN PRODUCT APPEARANCE IMAGE | ✓ | ✓ | ✓ | |
| Lv.5 | DISCLOSE ALL DATA | ✓ | ✓ | ✓ | ✓ |

FIG. 3B

| | MEANING OF DISCLOSURE LEVEL | REFERENCE DATA | | | | |
|---|---|---|---|---|---|---|
| | | ALL DATA OF OWN APPARATUS | DATA OF OTHER ADMINISTRATORS | | | |
| | | | SELECTED FEATURE VALUES | ALL FEATURE VALUES | IMAGING PARAMETER | INPUT ORIGINAL IMAGE |
| Lv.1 | NOT DISCLOSED | ✓ | | | | |
| Lv.2 | DISCLOSE ONLY SELECTED FEATURE VALUES | ✓ | ✓ | | | |
| Lv.3 | DISCLOSE ALL EXTRACTED FEATURE VALUES | ✓ | ✓ | ✓ | | |
| Lv.4 | DISCLOSE DATA OTHER THAN PRODUCT APPEARANCE IMAGE | ✓ | ✓ | ✓ | ✓ | |
| Lv.5 | DISCLOSE ALL DATA | ✓ | ✓ | ✓ | ✓ | ✓ |

INFORMATION PROCESSING APPARATUS AND METHOD FOR SPECIFYING LEARNING DATA

CROSS-REFERENCE TO RELATED APPLICATIONS

This application is a Continuation of International Patent Application No. PCT/JP2017/003385, filed Jan. 31, 2017, which claims the benefit of Japanese Patent Application No. 2016-025013, filed Feb. 12, 2016, both of which are hereby incorporated by reference herein in their entirety.

TECHNICAL FIELD

The present invention relates to an information processing apparatus, an information processing method, and a storage medium which are used to learn a discriminator used in an appearance inspection.

BACKGROUND ART

In general, automation of an appearance inspection is has been increasingly demanded in an appearance inspection process and the like in production sites. As an automation technique, a technique of discriminating non-defective products from defective products by a discriminator defined in advance using video/image data obtained by signal obtainment using a line sensor or an area sensor, for example, has been used.

However, when the discriminator is used in the appearance inspection, the discriminator is required to be defined in advance. To define the discriminator, the discriminator is appropriately controlled. The control of the discriminator is often performed when a production line is installed. However, learning data may not be sufficient since an amount of learning data is small for generation of the discriminator or data of defective products is little at the time of the installation.

NPL 1 discloses a method referred to as "transfer learning" as a technique of learning a discriminator of high accuracy even when an amount of data is small in a field of machine learning. The transfer learning is performed to efficiently find an effective hypothesis of a new task by applying knowledge obtained by learning in at least another task. Specifically, in the transfer learning, data is stored in advance, new similar data is compared with the data stored in the past, and a new discriminator is defined.

CITATION LIST

Patent Literature

PTL 1 Japanese Patent Laid-Open No. 2010-102690

Non Patent Literature

NPL 1 Sinno Jialin Pan and Qiang Yang, "A Survey on Transfer Learning" IEEE TRANSACTIONS ON KNOWLEDGE AND DATA ENGINEERING, VOL. 22, NO. 10, OCTOBER 2010

If a sufficient amount of learning data is obtained as described above, an appropriate discriminator may be generated. Therefore, there is a demand for collection of a sufficient amount of learning data.

The present invention is made in view of the problem described above and to collect a sufficient amount of learning data and generate an appropriate discriminator using the collected learning data.

SUMMARY OF INVENTION

According to an embodiment of the present invention, an information processing apparatus includes level setting unit configured to set a disclosure level of learning data used when a discriminator is generated, first specifying unit configured to specify, in accordance with the disclosure level, disclosure data to be disclosed to administrators other than a first administrator who manages the learning data in the learning data and association data which is associated with the learning data, second specifying unit configured to specify, in accordance with the disclosure level, reference data which is referred to by the first administrator in the learning data and the association data of the other administrators which are registered in a common storage apparatus, obtaining unit configured to obtain the reference data specified by the second specifying unit from the common storage apparatus, and generating unit configured to generate a discriminator using data obtained by the obtaining unit.

Further features of the present invention will become apparent from the following description of exemplary embodiments with reference to the attached drawings.

BRIEF DESCRIPTION OF DRAWINGS

FIGS. 3A and 3B are diagrams illustrating disclosure levels.

DESCRIPTION OF EMBODIMENTS

Hereinafter, embodiments of the present invention will be described with reference to the accompanying drawings.

First Embodiment

Figure 1:
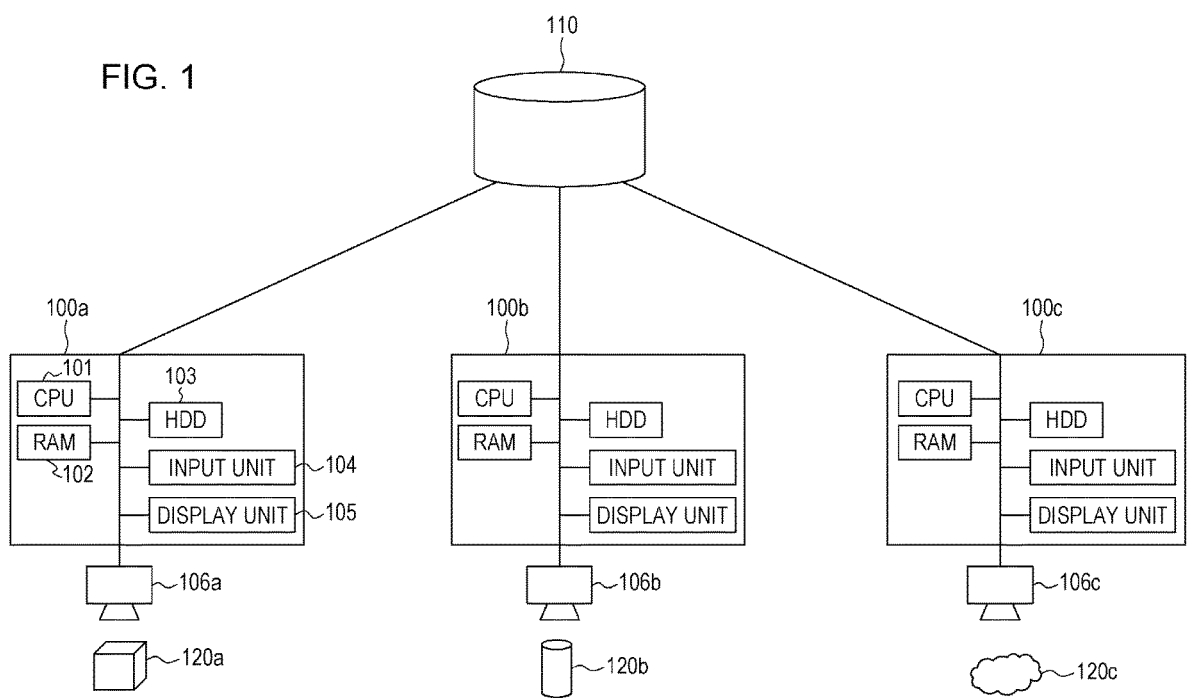
FIG. 1 is a diagram illustrating an information sharing system according to a first embodiment.

FIG. 1 is a diagram illustrating an information sharing system according to a first embodiment. The information sharing system includes three information processing apparatuses 100a to 100c corresponding to different production lines in three different factories. Here, the information processing apparatuses 100a to 100c perform an appearance inspection on objects 120a to 120c, respectively, which are different inspection targets. Note that, although a case where the information sharing system is employed in the three different production lines is illustrated in this embodiment, the number of production lines is not limited 3, and a similar system may be realized which is suitable for the number of production lines.

Imaging apparatuses 106a to 106c provided so as to correspond to the information processing apparatuses 100a to and 100c, respectively, capture images of the objects 120a to 120c, respectively, which are the inspection targets. The captured images are input to the information processing apparatuses 100a to 100c as inspection data. The information processing apparatuses 100a to 100c perform an appearance inspection on the objects 120a to 120c, respectively, which are the inspection targets using a discriminator based on the inspection data. Specifically, the information processing apparatuses 100a to 100c extract a plurality of feature values from the inspection data in accordance with an automatic appearance inspection algorithm and determine whether the respective objects 120a to 120c which are the inspection targets are non-defective or defective. The automatic appearance inspection algorithm determines whether to be non-defective or defective in accordance with a combination of feature values extracted from inspection target images captured as input data as disclosed in PTL 1. Users perform input of an instruction relative to the inspection data and perform parameter control and the like on the respective information processing apparatuses 100a to 100c.

The information processing apparatuses 100a to 100c further perform generation (learning) of a discriminator. In the learning, the imaging apparatuses 106a to 106c capture images of the objects 120a to 120c for learning, respectively, which have been determined non-defective or defective. The captured images are input to the information processing apparatuses 100a to 100c as learning data. The information processing apparatuses 100a to 100c extract a plurality of feature values from the learning data in accordance with the automatic appearance inspection algorithm and perform learning of a discriminator using the extracted feature values. The learning data of the present invention includes not only data having a label indicating a non-defective product or a defective product assigned thereto in advance but also data to which a label is not assigned.

Note that a label indicating a non-defective product or a defective product is assigned by the user in advance to the learning data at the time of learning. By this, a non-defective product or a defective product may be specified. Furthermore, it is assumed that parameters associated with an object for the learning are assigned to the learning data in addition to the label. Examples of the parameters include a component name, material, a production date, an imaging system parameter at a time of imaging, a lot number, temperature, and humidity. The parameters are supplementarily used when the learning data is shared by the information processing apparatuses 100a to 100c.

A basic algorithm is used in common in an off-line learning process and an on-line appearance inspection process in the information processing apparatuses 100a to 100c. Meanwhile, parameters and settings which define discriminators are independently set in the information processing apparatuses 100a to 100c in accordance with data used in the individual information processing apparatuses 100a to 100c. In this way, an integrated framework is realized.

The information processing apparatus 100a includes a central processing unit (CPU) 101, a random access memory (RAM) 102, a hardware disk drive (HDD) 103, an input unit 104, and a display unit 105. The CPU 101 executes various processes in accordance with control programs. The HDD 103 stores various information including image data and various programs. Note that functions and processes of the information processing apparatus 100a described below are realized when the CPU 101 reads the programs stored in the HDD 103 and executes the programs. The input unit 104 accepts a user operation. The display unit 105 displays various information. Note that hardware configurations of the information processing apparatuses 100b and 100c are the same as that of the information processing apparatus 100a.

A common storage apparatus 110 stores learning data and association data. Here, the association data includes data associated with learning data, feature value data extracted from the learning data, and imaging parameters. The learning data and the association data are managed for each administrator. The common storage apparatus 110 stores the learning data and the association data which are associated with an administrator ID which identifies an administrator. By this, the information sharing system may identify an administrator of the learning data and the association data. Note that only learning data and association data which are allowed to be disclosed (provided) by an administrator of the data to other administrators are stored in the common storage apparatus 110.

It is assumed, in this embodiment, that an administrator of data obtained by the information processing apparatus 100a is an administrator A. Furthermore, it is assumed that an administrator of data obtained by the information processing apparatus 100b is an administrator B. It is assumed that an administrator of data obtained by the information processing apparatus 100c is an administrator C. Note that a company, an organization, such as a department in a company, or a person who is a representative of an organization is set as an administrator, for example.

It is assumed hereinafter that the common storage apparatus 110 has already stored data which is allowed to be disclosed to other administrators (other users) in learning data and association data of the information processing apparatus 100b which are managed by the administrator B in this embodiment. It is assumed further that the common storage apparatus 110 has already stored data which is allowed to be disclosed to other administrators in learning data of the information processing apparatus 100c which is managed by the administrator C. Hereinafter, data managed by an administrator X is referred to as "data of the administrator X".

It is assumed, on the other hand, that in the information processing apparatus 100a, an amount of learning data which is sufficient for learning of a discriminator is not obtained. In this case, the information processing apparatus 100a obtains data managed by the administrators (the administrators B and C) other than the administrator of the information processing apparatus 100a as reference data from the common storage apparatus 110. Then the information processing apparatus 100a may learn a discriminator using the obtained reference data and the learning data input from the input unit 104. This process will be described with reference to FIG. 2.

Figure 2:
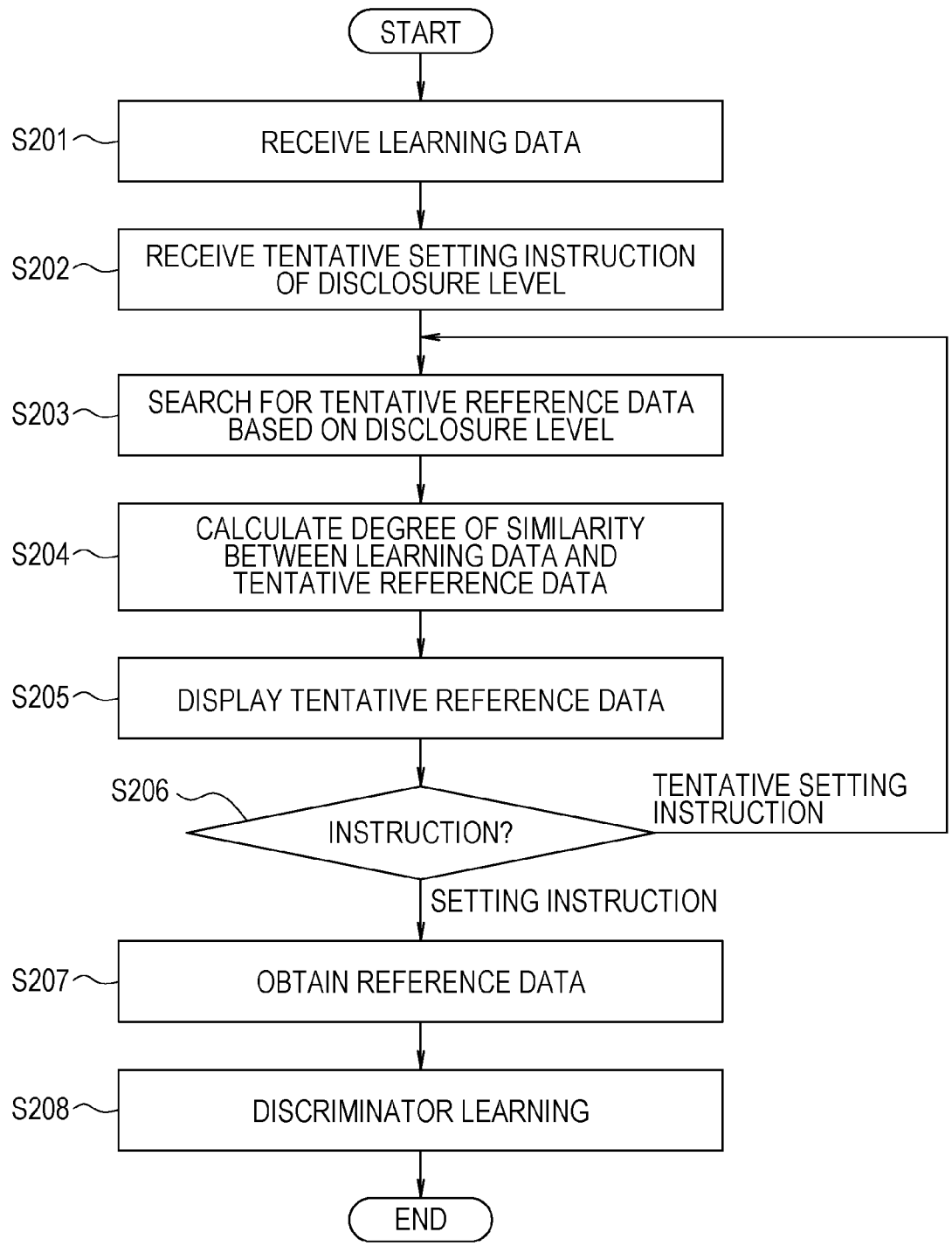
FIG. 2 is a flowchart of a discriminator generation process.

FIG. 2 is a flowchart of a discriminator generation process executed by the information processing apparatus 100a. In step S201, the CPU 101 of the information processing apparatus 100a receives an input of learning data from the imaging apparatus 106a. The CPU 101 further receives an input of the imaging parameters associated with imaging of the learning data. Furthermore, the CPU 101 extracts a plurality of feature values required for the learning of a discriminator from the learning data. Note that the number of feature values to be extracted is not limited. In the following process, the imaging parameters and data on the feature values obtained in step S201 are processed as association data of the learning data.

In step S202, the CPU 101 receives a tentative setting instruction of a disclosure level in accordance with a user input. Here, the disclosure level is information indicating a degree of disclosure of the learning data received in step S201.

FIGS. 3A and 3B are diagrams illustrating disclosure levels. Specifically, FIG. 3A is a diagram illustrating data disclosed to the other administrators when disclosure levels are set. FIG. 3B is a diagram illustrating data of the other administrators which may be obtained from the common storage apparatus 110 when the disclosure levels are set. As illustrated in FIG. 3A, five disclosure levels, that is, levels Lv. 1 to Lv. 5 are set.

Lv. 1 is a lowest level of a degree of disclosure. The disclosure data is not set in Lv. 1. Specifically, when Lv. 1 is set, the information processing apparatus 100a does not store the learning data or the association data obtained by the own apparatus in the common storage apparatus 110. Lv. 2 is a second lowest level of a degree of disclosure. In Lv. 2, feature value data selected by the user from the plurality of feature value data obtained from the learning data obtained by the own apparatus is set as the disclosure data. Specifically, when Lv. 2 is set, the information processing apparatus 100a stores the feature value data selected by the user in the common storage apparatus 110.

In Lv. 3, all the plurality of feature value data obtained by the own apparatus are set as the disclosure data. Specifically, when Lv. 3 is set, the information processing apparatus 100a stores all the plurality of feature value data obtained by the information processing apparatus 100a in the common storage apparatus 110. Lv. 4 is a third lowest level of a degree of disclosure. In Lv. 4, data other than an appearance image of an object for learning is set as the disclosure data. When Lv. 4 is set, the information processing apparatus 100a stores the imaging parameters in addition to all the plurality of feature value data obtained by the information processing apparatus 100a in the common storage apparatus 110. Lv. 5 is a highest level of a degree of disclosure. In Lv. 5, all data obtained by the information processing apparatus 100a, that is, all the learning data and all the association data, is set as the disclosure data. Specifically, when Lv. 5 is set, the information processing apparatus 100a stores all the learning data and all the association data in the common storage apparatus 110.

In this way, when the user sets the disclosure levels, the CPU 101 specifies a type of data to be disclosed in accordance with the set disclosure levels. Then the CPU 101 stores data corresponding to a type determined in accordance with the disclosure levels in the data obtained by the own apparatus in the common storage apparatus 110. Specifically, the data corresponding to the type determined in accordance with the disclosure levels is disclosed in a form in which the other administrators may refer to the data. In this way, the user sets a disclosure level in accordance with a degree of secrecy of the learning data obtained by the own apparatus, an inspection target, or the object for learning so as to specify a type of data to be disclosed.

As illustrated in FIG. 3B, reference data is not set in Lv. 1. In Lv. 1, the apparatus does not disclose any data of the own apparatus. In Lv. 2, selected feature value data is set as the reference data in the data of the other administrators. In Lv. 3, all the feature value data of the other administrators is set as the reference data. In Lv. 4, all the feature value data of the other administrators and the imaging parameters are set as the reference data. In Lv. 5, all the data of the other administrators, that is, all the learning data and all the association data are set as the reference data. In this way, in the individual disclosure levels, the disclosure data and the reference data correspond to each other. Accordingly, the administrator may obtain data corresponding to data disclosed by the administrator.

Referring back to FIG. 2, in step S203, the CPU 101 searches for tentative reference data corresponding to the disclosure level associated with the tentative setting instruction received in step S202 so as to generate a list. Here, the tentative reference data may be obtained by the CPU 101 when the disclosure level corresponding to the tentative setting instruction is set. In step S204, the CPU 101 calculates a degree of similarity based on tentative disclosure data and tentative reference data which are defined in accordance with the disclosure level corresponding to the tentative setting instruction. Then the CPU 101 extracts a predetermined number of data in order from a highest degree of similarity as tentative reference data. Note that a process of calculating a similarity degree will be described in detail hereinafter. Thereafter, the CPU 101 performs control such that display data indicating the tentative reference data is displayed in the display unit 105 of the information processing apparatus 100a (a display process). As described in NPL 1, the transfer learning becomes most effective when stored transfer source data and transfer destination data which are an inspection target are moderately similar to each other. Accordingly, since the reference data is extracted in accordance with a degree of similarity, appropriate data may be obtained as the tentative reference data.

Figure 4A:
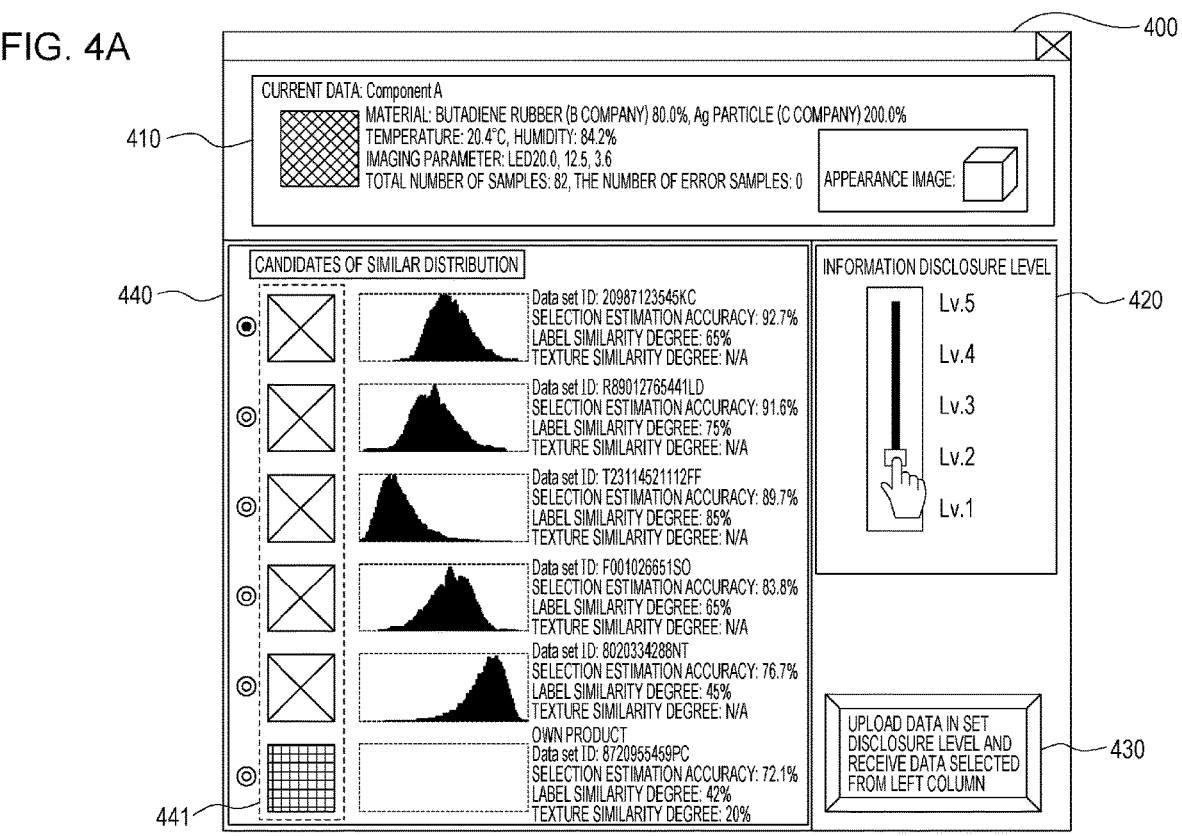
FIGS. 4A and 4B are diagrams illustrating examples of an operation window.
Figure 4B:
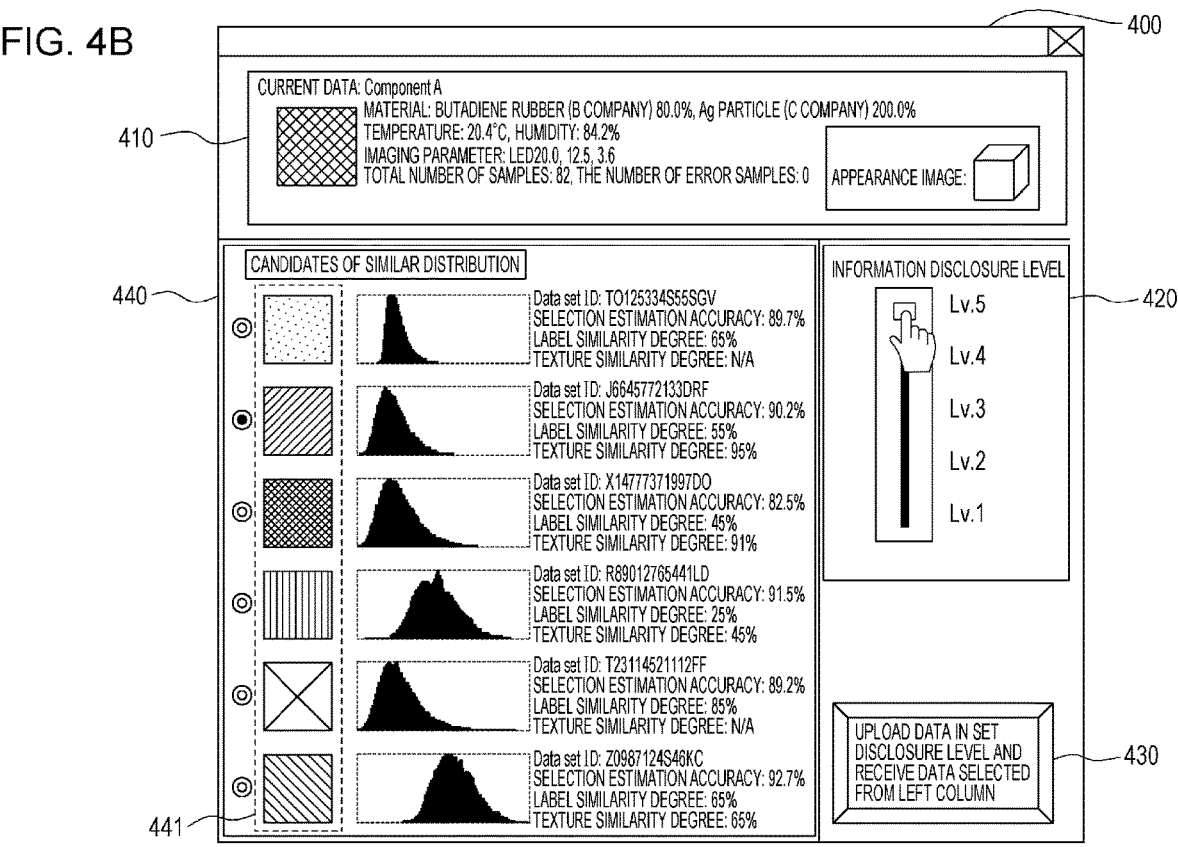

FIGS. 4A and 4B are diagrams illustrating examples of an operation window displayed in the display unit 105 of the information processing apparatus 100a in the process from step S203 to step S204. In a learning data region 410 of an operation window 400 of FIG. 4A, the learning data of the own apparatus (the information processing apparatus 100a) and parameters including the association data of the learning data are displayed. In the learning data region 410, information associated with the inspection target which is registered by the user including a component name, a representative appearance image, material, a temperature, humidity, and the imaging parameters is displayed.

A reference numeral 420 indicates an operation bar of a disclosure level. In the example of FIG. 4A, the user operates the operation bar 420 so as to perform a tentative setting to Lv. 2. A button 430 is used to input a setting instruction of a disclosure level. The user presses the button 430 in a state in which the operation bar 420 is set to a desired disclosure level, so as to input a setting instruction. The tentative reference data obtained in the process from step S203 to step S204 in accordance with a disclosure level corresponding to the tentative setting instruction input in accordance with the operation on the operation bar 420 is displayed in a reference data region 440. In the example of FIG. 4A, five tentative reference data is displayed. Note that lowermost data in the reference data region 440 is data of the own apparatus. Content of the display in the reference data region 440 corresponds to display data displayed in the step S204.

When receiving a tentative setting instruction of the disclosure level of Lv. 2, the CPU 101 sets feature value data selected by the user in the data of the administrator A as the disclosure data as illustrated with reference to FIGS. 3A and 3B. Accordingly, as illustrated in FIG. 4A, the tentative reference data only includes the learning data and the association data of the administrator A and the selected feature value data of the other administrators. As for the data of the other administrators, only the feature value data may be referred to, and therefore, information on texture and the like of an original image (a captured image) may not be displayed in the display unit 105.

In the example of FIG. 4A, a predetermined number of data in the data of the other administrators which obtains higher evaluation in the evaluation of similarity of data distribution performed with reference to only the selected feature value data is automatically selected and is displayed in the reference data region 440. Note that, in Lv. 2, representative captured images to be displayed in a left column are not displayed. Note that a captured image 441 is the learning data obtained by the own apparatus.

FIG. 4B is a diagram illustrating the operation window 400 displayed when the user performs a tentative setting operation in Lv. 5. The disclosure level of Lv. 5 is a setting for disclosing all data, and all the data which is set to be disclosed is reference data. Specifically, when the information disclosure level of Lv. 5 is set, all data corresponding to a setting of Lv. 5 of the other administrators may be referred to. Therefore, in the example of FIG. 4B, the number of data displayed in the reference data region 440 is increased when compared with the example of FIG. 4A. Note that data in which a disclosure level lower than Lv. 5 is set by the other administrators is not selected as reference data. Furthermore, when receiving a tentative setting instruction in the disclosure level of Lv. 5, the CPU 101 calculates a degree of similarity taking a texture similarity degree into consideration when the similarity degree calculation is performed, and therefore, different tentative reference data is obtained in step S203 and step S204.

In this way, since the tentative reference data may be checked by changing a disclosure level in the operation window 400, a change of an amount (quality) of data which may be referred to by the administrator A in accordance with the disclosure level may be intuitively recognized by the user. Furthermore, the user is effectively prompted to act for the data disclosure.

Referring back to FIG. 2, in step S206, the CPU 101 checks content of an instruction issued in accordance with a user operation. When receiving a tentative setting instruction in which a disclosure level is changed in accordance with an operation on the operation bar 420 (a tentative setting instruction in step S206), the CPU 101 returns to step S203. In this case, the process in step S203 onwards is performed again. The CPU 101 proceeds to step S207 when receiving a setting instruction (a setting instruction in step S206) in accordance with a press of the button 430.

In step S207, the CPU 101 specifies reference data in accordance with a disclosure level of the setting instruction (a specifying process). Thereafter, the CPU 101 obtains (receives) reference data from the common storage apparatus 110 (an obtaining process). Here, the CPU 101 specifies disclosure data in the data of the administrator A in accordance with the disclosure level of the setting instruction (a specifying process). Thereafter, the CPU 101 registers (transmits) the disclosure data in the common storage apparatus 110. By this, the disclosure data is stored in the common storage apparatus 110 in a state in which the disclosure data is associated with an administrator ID of the administrator A.

In step S208, the CPU 101 executes the transfer learning so that the received reference data which corresponds to the learning data of the own apparatus is utilized. Thereafter, the CPU 101 causes the user to input a result of a determination as to whether data in the vicinity of a boundary in transferred data is normal or abnormal so that a discriminator is finally generated (a generation process). Note that new information is added to the data of the other administrators obtained from the common storage apparatus 110. The CPU 101 stores the added information in the common storage apparatus 110. For example, the CPU 101 feeds back a feature value of the abnormal data newly generated, an amount of information on labeling, and the like to the common storage apparatus 110. By this, when the data is disclosed, an amount of information stored in the common storage apparatus 110 is increased, and in addition, new information is added and an information value of data to be used by the own apparatus may be increased.

Next, the similarity degree calculation process in step S204 will be described. In this embodiment, a measurement method using Kullback-Leibler information between two distributions is employed as a method for defining a similarity degree which is most widely applicable. A distribution of the transfer source data and a distribution of the transfer destination data to be inspected are based on continuous probability distribution, and therefore, the distributions are defined by Expression 1.

$$D_{KL}(P\|Q) = \int_{-\infty}^{\infty} p(x) \log \frac{p(x)}{q(x)} dx \qquad \text{Expression 1}$$

Here, P denotes the distribution of the transfer source data and Q denotes the distribution of the transfer destination data. Furthermore, p and q indicate probability density functions of P and Q, respectively.

If an information amount defined in Expression 1 is smaller, the two distributions are similar to each other. In the disclosure level of Lv. 2, Kullback-Leibler information is measured only using a set of the same feature values in the selected feature values. However, in the disclosure level of Lv. 3, measurement using all extracted feature values may be performed. In Lv. 4, comparison may be performed using a component name, material, a temperature, humidity, and imaging parameters so as to determine whether the two distributions are similar to each other. Furthermore, in Lv. 5, a similarity degree between textures in a normal state may be measured within a framework which is different from the extracted feature values. Specifically, a determination as to whether the two distributions are similar to each other may be made using a function of evaluating a similarity degree between textures in addition to the extracted feature values used until Lv. 4.

Figure 5:
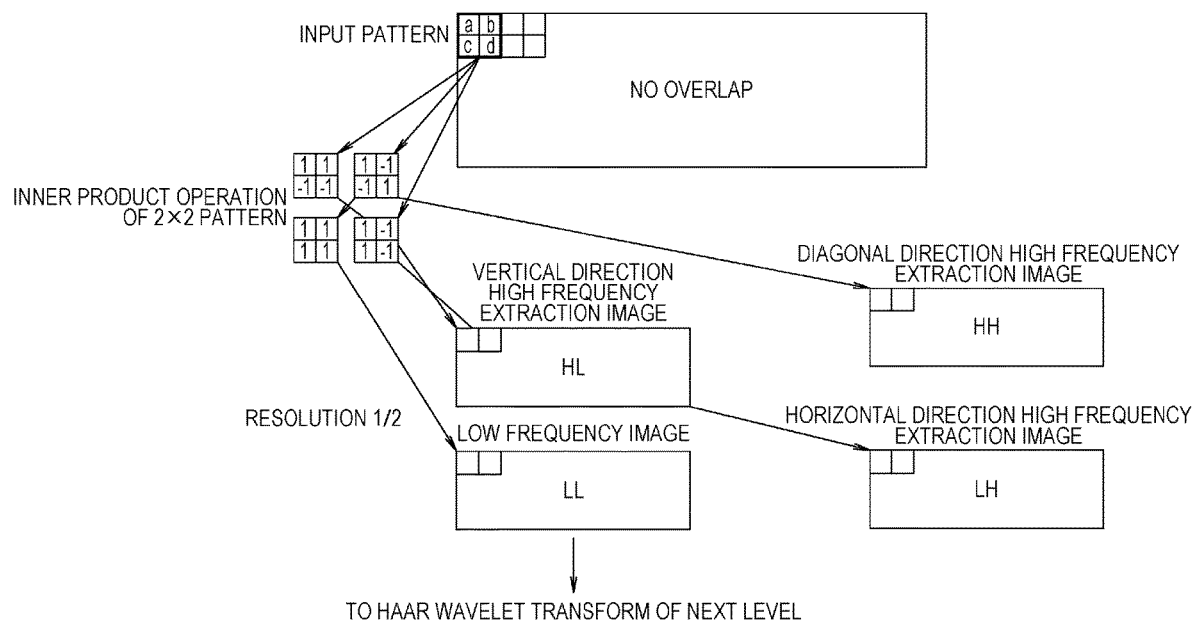
FIG. 5 is an explanatory diagram illustrating a similarity degree calculation process.

The method for calculating the similarity degree between the textures may be employed in a concrete example in FIG. 5. The CPU 101 randomly selects at least one image having a normal label from among images to be inspected and extracts feature values for the calculation of a texture similarity degree from only the selected image. The CPU 101 controls a size of the input image to be a fixed image size defined in advance. In this embodiment, one of vertical and horizontal lengths which is longer is enlarged or reduced so as to be constantly equal to the other.

Then the CPU 101 performs Haar wavelet transform which is one of methods for conversion to a frequency domain on at least one image which has been subjected to the image size control. The CPU 101 first performs an inner product operation using four types of filter on an input pattern before the transform. As a result, the four types of pattern, that is, a vertical direction high frequency component extraction pattern (HL), a diagonal direction high frequency component extraction pattern (HH), a horizontal direction high frequency component extraction pattern (LH), and a low frequency component extraction pattern (LL) are generated. A method for generating the vertical direction high frequency component extraction pattern will be described in detail.

It is assumed here that an inner product (a+b−c−d) of four pixels below of an input pattern illustrated in FIG. 5 is determined as a value of a pixel of the vertical direction high frequency component extraction pattern.

$$\begin{bmatrix} a & b \\ c & d \end{bmatrix} \text{ and } \begin{bmatrix} 1 & 1 \\ -1 & -1 \end{bmatrix}$$

The CPU 101 performs such a calculation in all image regions for every four pixels without overlapping the pixels so as to generate a horizontal direction high frequency component extraction pattern.

In the diagonal direction high frequency component extraction pattern, the horizontal direction high frequency component pattern, and the low frequency component extraction pattern, the following filters are used.

$$\begin{bmatrix} 1 & -1 \\ -1 & 1 \end{bmatrix} \begin{bmatrix} 1 & -1 \\ 1 & -1 \end{bmatrix} \frac{1}{4}\begin{bmatrix} 1 & 1 \\ 1 & 1 \end{bmatrix}$$

The CPU 101 generates four types of pattern in resolution reduced to half as a result. The CPU 101 performs Haar wavelet transform in a next level from the low frequency component extraction pattern so as to generate four types of pattern having resolution further reduced to half. In this way, the CPU 101 performs the transform to a hierarchically low frequency. In this way, a process is repeatedly performed until a vertical length or a horizontal length of an image reaches one pixel so that a plurality of patterns may be obtained.

For example, when the process is performed seven times, 29 types (1+4×7=29) of pattern including an original image before transform may be obtained. Then combinations of average values and values of standard deviations are individually obtained from the 29 types of pattern. By this, a 58-dimensional vector in which 58 numerical values are connected to one another is obtained from one image and is determined as a vector for describing texture. The CPU 101 obtains an average value of values of 58-dimensional vectors obtained from a plurality of images when selecting a plurality of normal images first, and the average value is defined as a vector describing texture. Then the CPU 101 obtains the similarity degree between textures by a distance obtained by comparing the vectors defined as described above. Any type of distance may be employed including a Euclidean distance and a Manhattan distance.

The CPU 101 calculates an one-dimensional score using Kullback-Leibler information obtained by comparing distributions of feature values by the described method and a score calculated from a similarity degree between normal textures so as to perform similar data candidate narrowing. The CPU 101 may perform weighting on the individual scores and add the scores to each other so as to calculate a one-dimensional score.

As described above, according to the information sharing system of this embodiment, the user may determine data to be disclosed in accordance with a disclosure level instead of an alternative decision as to whether the data obtained by the own apparatus is to be disclosed or not to be disclosed. Accordingly, even when all data may not be disclosed, disclosure of only data in a disclosure available level may be effectively prompted. As described above, in the information sharing system according to this embodiment, individual information processing apparatuses may supply data of own apparatus to the common storage apparatus 110 in a step-by-step manner when obtaining data from the common storage apparatus 110. Furthermore, the individual information processing apparatuses may share data in an integrated framework even in a case where disclosure levels of the apparatuses are different from each other. In particular, a discriminator may be easily set at a time of installation of a production line. With this system, the individual information processing apparatuses may collect a sufficient amount of learning data from the other information processing apparatuses and generate an appropriate discriminator using the collected learning data.

In an actual appearance inspection, secrecy policies of individual products are different from one another, and data stored in the past may not be casually used in other inspections. Furthermore, a number of users do not care about improvement of accuracy by applying data of another user to own data but care about improvement of capability of a discriminator of another user using own data. In particular, a number of users who feel uncomfortable tends to be increased if the other user works in a different factory or a different company.

For example, an appearance inspection image of a product represents a product design itself or a part of the product design in many cases. Therefore, the appearance inspection image may often be confidential in each company, and in this case, it is highly likely that an image obtained by an area sensor may not be disclosed to other users. If a large amount data is collected, possibility that a high-accuracy discriminator is generated is increased, and therefore, all users have advantage. However, collection and storage of data is not smoothly progressed if the users have high psychological barriers to disclose data. If data is not collected, it may be difficult to realize the system of generating a discriminator of high accuracy by applying knowledge of stored data to new data. To address this problem, in the information sharing system according to this embodiment, each of the information processing apparatuses may collect a sufficient amount of learning data from the other information processing apparatuses and generate an appropriate discriminator using the collected learning data.

As a modification of the first embodiment, a method for setting a disclosure level is not limited to this embodiment. As another example, the user may set whether or not to disclose data for each parameter instead of the hierarchical level setting.

Second Embodiment

Figure 6:
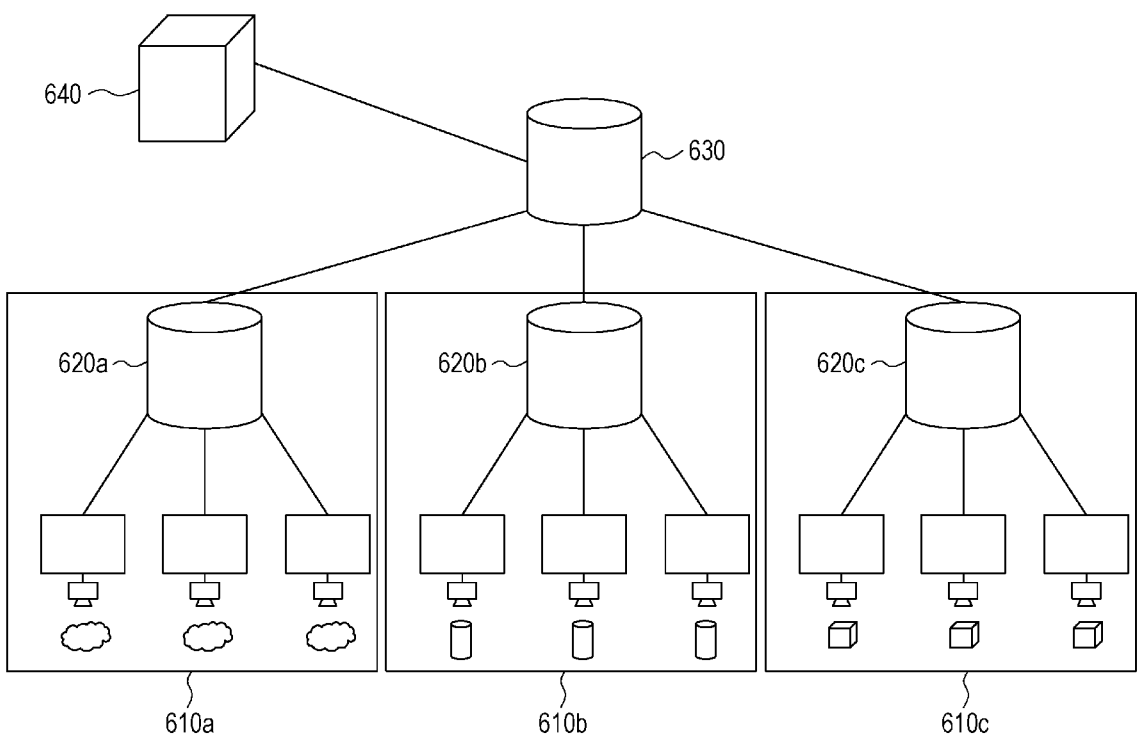
FIG. 6 is a diagram illustrating an entire information sharing system according to a second embodiment.

Next, an information sharing system according to a second embodiment will be described. It is assumed here that different information sharing systems are provided in different production lines of three different administrators. FIG. 6 is a diagram illustrating the entire information sharing system according to the second embodiment. The information sharing system include a first system 610*a*, a second system 610*b*, a third system 610*c* which are installed in different production lines of different administrators, an administrator common storage apparatus 630, and an algorithm storage apparatus 640. The first system 610*a* includes a first common storage apparatus 620*a*. The second system

610b includes a second common storage apparatus 620b. The third system 610c includes a third common storage apparatus 620c.

The systems 610a to 610c have a configuration the same as that of the information sharing system according to the first embodiment. Data stored in each of the common storage apparatuses 620a to 620c is managed by the same administrator, and therefore, the data may be freely shared in information processing apparatuses included in the same system so as to be used for the transfer learning. In this embodiment, a disclosure level is set to data stored in the common storage apparatuses 620a to 620c, and data corresponding to a disclosure level is stored in the administrator common storage apparatus 630. The other configuration is the same as that of the first embodiment.

As described in the first embodiment, users may feel uncomfortable if data obtained in a production line is disclosed to other administrators. Therefore, as described above, in a system in which data is directly registered in the administrator common storage apparatus 630 from the different production lines of the different administrators, there may be a high barrier to introduce the system. Accordingly, as a first step, a system in which data is shared (referred to) by a plurality of production lines managed by different administrators is introduced so that the users may recognize that a load is reduced by the data sharing at a time of installation of the production lines. Specifically, in this step, the systems 610a to 610c are not connected to the administrator common storage apparatus 630. Then it is assumed that the users share own data among production lines and sufficiently recognize the advantage of installation of this system. At this time, data may be appropriately supplied to the administrator common storage apparatus 630 for the first time by setting a disclosure level, and data may be obtained from the administrator common storage apparatus 630 for the first time.

Furthermore, in the case where the system is configured in a step-by-step manner as described above, if the policies for the data disclosure of the administrators are changed and cooperation with the administrator common storage apparatus 630 is stopped, the administrator common storage apparatus 630 is merely disconnected from the systems of the users. Even after the disconnection, each of the administrators may continuously use the system in a closed environment in the production line of the same user.

Also in a case where a policy of data disclosure is updated, updated reference data is set in accordance with a disclosure level. By this, in data stored in the administrator common storage apparatus 630, data of the other administrators which may be referred to under a past policy may not be referred to under an updated policy. However, the data disclosed under the policy set in the past is not deleted from the administrator common storage apparatus 630. This is because the donation of data by disclosing data in the past is compensation for use of own discriminator improved by referring to data of the other administrators.

Furthermore, the algorithm storage apparatus 640 is connected to the administrator common storage apparatus 630. The algorithm storage apparatus 640 manages an algorithm shared by all the systems 610a to 610c. The algorithm storage apparatus 640 manages information on a method, including a feature extraction method, a discriminator, and various parameters. When the algorithm is updated, the algorithm storage apparatus 640 transmits information on the update to the administrator common storage apparatus 630.

When the algorithm is updated, data (including the extracted feature value and the other parameters) obtained by the past algorithm and stored in the administrator common storage apparatus 630 is also required to be updated. Therefore, the updated algorithm is applied to the past data stored in the administrator common storage apparatus 630. If a new feature extraction method is added, for example, feature values extracted by the newly-added feature extraction method from an original image group stored in the past are added to original data and stored as additional information. Furthermore, the newly-extracted feature values are transmitted to the common storage apparatuses 620a to 620c which execute the feature values and transmitted to an appearance inspection apparatus in an end production line so as to be used for learning of new data.

Furthermore, in data of a production line of own company, data associated with new products are highly confidential, and therefore, it is highly possible that such data is not supplied to the administrator common storage apparatus 630. On the other hand, data associated with products which have produced a long period of time ago, products which have been sold in markets, and products which have no longer produced may be disclosed. Values as reference data for learning of a discriminator are not changed irrespective of a timing when the data is obtained. Therefore, in this embodiment, data which has been obtained in the past as described above, which has not been supplied to the administrator common storage apparatus 630, and which has been stored in the common storage apparatuses 620a to 620c may be set as disclosure data. Then the administrator who supplies the data obtained in the past as disclosure data may obtain reference data in response to the supply of the disclosure data.

Figure 7:
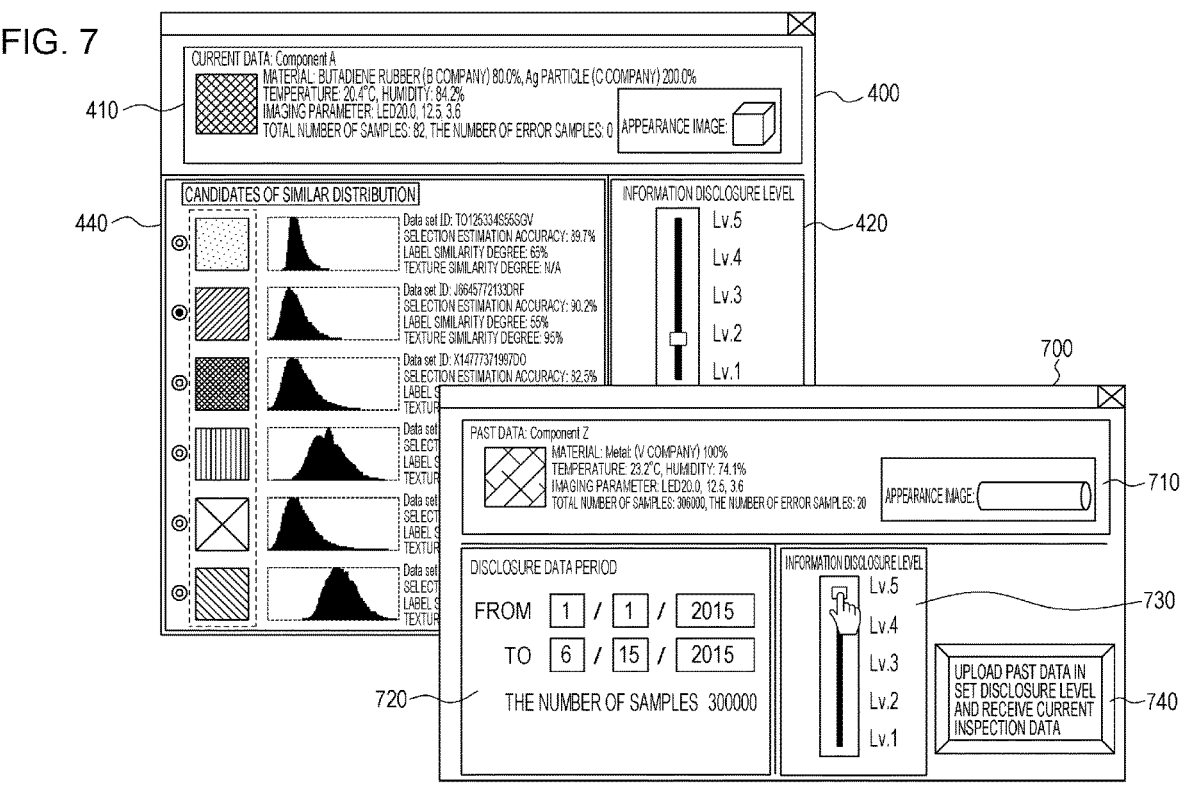
FIG. 7 is a diagram illustrating examples of operation windows.

In a case where data which is associated with a product which has been produced in the past and which is not disclosed is supplied to the administrator common storage apparatus 630, the CPU 101 displays an operation window 700 for the past data as illustrated in FIG. 7 in addition to the operation window 400 illustrated in FIGS. 4A and 4B. Note that the operation window 400 is the same as that of the first embodiment described with reference to FIGS. 4A and 4B. When the administrator inputs an ID, a name, or the like of past data to be supplied so as to newly supply the data which has not been supplied to the administrator common storage apparatus 630 in the past to the administrator common storage apparatus 630, the operation window 700 is displayed. A past learning data region 710 is displayed in an upper portion in the operation window 700, and as with the learning data region 410, past learning data and parameters of association data and the like of the learning data are displayed.

Furthermore, an input box for inputting a target period of the past data is disposed in a region 720. When the target period is input, the number of target samples is displayed in the region 720. In the example of FIG. 7, the number of samples is 300000. A reference numeral 730 indicates an operation bar of a disclosure level. When the user operates the operation bar 730, a disclosure level of a tentative setting instruction or a setting instruction of a disclosure level of the past data is input. When the operation bar 730 is operated, tentative reference data specified in accordance with the disclosure level is displayed in the reference data region 440 of the operation window 400. Note that the CPU 101 specifies learning data to be processed at a time of processing irrespective of the past data, that is, data having tendency similar to that of data displayed in the learning data region 410 as tentative reference data.

In the example of FIG. 7, a disclosure level set to the learning data to be processed is Lv. 2 in the operation window 400 and a disclosure level set (changed) to the past data is Lv. 5. In this case, data corresponding to the disclosure level of Lv. 5 after the change is specified as tentative reference data. When the number of samples of the past data to be disclosed is 300000, a service equivalent to a service corresponding to an information disclosure level of Lv. 5 is provided while a current inspection target is inspected for 300000 samples. After the inspection for 300000 samples is terminated, the disclosure level of the data returns to Lv. 2 again. However, parameters of a discriminator obtained when the disclosure level is Lv. 5 remains.

A method for improving accuracy by efficiently using shared data associated with inspection by flexibly setting a data state and a disclosure level has been thus described. Note that data storage apparatuses may be provided for only two layers of disclosure and non-disclosure but also for individual disclosure levels which are finely classified. Furthermore, data disclosure may be prompted by changing a fee for using a system in accordance with an information disclosure level.

OTHER EMBODIMENTS

The present invention may be realized by a process of supplying a program which realizes at least one of the functions in the foregoing embodiment to a system or an apparatus through a network or a storage medium and reading and executing the program using at least one processor included in a computer of the system or the apparatus. Alternatively, the present invention may be realized by a circuit which realizes at least one of the functions (an application specific integrated circuit (ASIC)).

According to the present invention, a sufficient amount of learning data may be collected and an appropriate discriminator may be generated using the collected learning data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A information processing apparatus, comprising:
one or more processors; and
at least one memory coupled to the one or more processors, the memory having stored thereon instructions which, when executed by the one or more processors, cause the apparatus to:
set a disclosure level of learning data used when a discriminator is generated;
specify, in accordance with the disclosure level, disclosure data to be disclosed to administrators other than a first administrator who manages the learning data in the learning data and association data which is associated with the learning data;
specify, in accordance with the disclosure level, reference data which is referred to by the first administrator in the learning data and the association data of the other administrators which are registered in a common storage apparatus;
obtain the specified reference data from the common storage apparatus; and
generate a discriminator using the obtained data.

2. The information processing apparatus according to claim 1,
wherein a type of data corresponding to the disclosure level is specified as the disclosure data, and
a type of data corresponding to the disclosure level is specified as the reference data.

3. The information processing apparatus according to claim 1, wherein the disclosure level is set in accordance with a user input.

4. The information processing apparatus according to claim 1, wherein feature value data of the learning data of the first administrator is specified as the disclosure data when a first disclosure level is set, and feature value data of learning data of the other administrators is specified as the reference data when the first disclosure level is set.

5. The information processing apparatus according to claim 4,
wherein the learning data is a captured image,
the feature value data of the learning data of the first administrator and imaging parameters is specified as the disclosure data when a second disclosure level which has a degree of disclosure higher than that of the first disclosure level is set, and
the feature value data of the learning data of the other administrators and imaging parameters is specified as the reference data when the second disclosure level is set.

6. The information processing apparatus according to claim 5,
wherein the feature value data of the learning data of the first administrator, the imaging parameters, and the learning data are specified as the disclosure data when a third disclosure level having a degree of disclosure higher than that of the second disclosure level is set, and
the feature value data of the learning data of the other administrators, the imaging parameters, and the learning data are specified as the reference data when the third level is set.

7. The information processing apparatus according to claim 1, wherein the reference data is specified in accordance with a degree of similarity between data of the other administrators and the learning data of the first administrator.

8. The information processing apparatus according to claim 1, wherein the level setting unit sets a disclosure level is set in accordance with a setting instruction when receiving the setting instruction of the disclosure level from a user.

9. The information processing apparatus according to claim 1, further comprising:
tentative reference data is specified in accordance with a disclosure level of a tentative setting instruction when receiving the tentative setting instruction of the disclosure level from the user; and
control a display such that display data indicating the tentative reference data is displayed.

10. The information processing apparatus according to claim 1, when an algorithm for obtaining the association data is updated, the disclosure data in association data obtained by the updated algorithm is specified in accordance with the set disclosure level.

11. The information processing apparatus according to claim 1,
wherein the disclosure level of learning data obtained in the past is changed,
the disclosure data in the learning data obtained in the past or association data obtained from the learning data is specified in accordance with the changed disclosure level, and the reference data is specified in accordance with the changed disclosure level.

12. An information processing method executed by an information processing apparatus, comprising:
- setting a disclosure level of learning data used when a discriminator is generated;
- specifying, in accordance with the disclosure level, disclosure data to be disclosed to administrators other than a first administrator who manages the learning data in the learning data and association data which is associated with the learning data;
- specifying, in accordance with the disclosure level, reference data which is referred to by the first administrator in the learning data and the association data of the other administrators which are registered in a common storage apparatus;
- obtaining the specified reference data from the common storage apparatus; and
- generating a discriminator using obtained data.

13. A non-transitory computer readable storage medium which stores a program which causes a computer to perform operations comprising:
- setting a disclosure level of learning data used when a discriminator is generated;
- specifying, in accordance with the disclosure level, disclosure data to be disclosed to administrators other than a first administrator who manages the learning data in the learning data and association data which is associated with the learning data;
- specifying, in accordance with the disclosure level, reference data which is referred to by the first administrator in the learning data and the association data of the other administrators which are registered in a common storage apparatus;
- obtaining the specified reference data from the common storage apparatus; and
- generating a discriminator using the obtained data.

* * * * *